United States Patent
Takashima et al.

(10) Patent No.: US 7,380,027 B2
(45) Date of Patent: May 27, 2008

(54) DMA CONTROLLER AND DMA TRANSFER METHOD

(75) Inventors: Kazuhito Takashima, Kawasaki (JP); Hiromitsu Horie, Kawasaki (JP); Yuji Tarui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 204 days.

(21) Appl. No.: 10/642,145

(22) Filed: Aug. 18, 2003

(65) Prior Publication Data

US 2004/0044809 A1    Mar. 4, 2004

(30) Foreign Application Priority Data

Aug. 30, 2002  (JP)  .............................. 2002-252704

(51) Int. Cl.
*G06F 13/28* (2006.01)
*G06F 13/00* (2006.01)

(52) U.S. Cl. ............................. 710/22; 710/25; 710/33; 710/35

(58) Field of Classification Search .................. 710/22, 710/25, 28, 29, 33, 36, 37, 38
See application file for complete search history.

(56) References Cited

U.S. PATENT DOCUMENTS

| | | | | |
|---|---|---|---|---|
| 5,179,663 A | * | 1/1993 | Iimura ........................ | 710/35 |
| 5,613,162 A | * | 3/1997 | Kabenjian .................... | 710/22 |
| 5,623,606 A | * | 4/1997 | Yokoyama et al. ......... | 709/232 |
| 5,655,151 A | * | 8/1997 | Bowes et al. ................. | 710/22 |
| 6,493,803 B1 | * | 12/2002 | Pham et al. .................. | 710/22 |
| 6,691,182 B2 | * | 2/2004 | Kagemoto ................... | 710/28 |
| 6,775,717 B1 | * | 8/2004 | Tang et al. ................... | 710/22 |
| 2001/0013076 A1 | * | 8/2001 | Yamamoto ................... | 710/33 |
| 2002/0004861 A1 | * | 1/2002 | Kagemoto ................... | 710/23 |

* cited by examiner

*Primary Examiner*—Niketa Patel
*Assistant Examiner*—Richard B. Franklin
(74) *Attorney, Agent, or Firm*—Staas & Halsey LLP (57) ABSTRACT

A DMA channel data quantity setting section sets a data transfer quantity of each of a plurality of DMA channels in accordance with a data quantity or a ratio in advance. A channel select control circuit determines whether each DMA channel is active. A data transfer control circuit transfers the data of the DMA channel determined to be active by the channel select control circuit in accordance with the data transfer quantity of each DMA channel set by the DMA channel data quantity setting section. By doing so, a plurality of DMA requests are accepted per bus hold request, and the number of bus management right arbitration procedures and the latency between the channels are decreased.

8 Claims, 10 Drawing Sheets

| BIT | Bit1 | Bit0 |
|---|---|---|
| FUNCTION NAME | RT1 | RT0 |

FIG.3B

| RT1 | RT0 | BURST RATIO |
|---|---|---|
| 0 | 0 | 0% OF BURST LENGTH REGISTER (NO DATA TRANSFER) |
| 0 | 1 | 25% OF BURST LENGTH REGISTER |
| 1 | 0 | 50% OF BURST LENGTH REGISTER |
| 1 | 1 | 75% OF BURST LENGTH REGISTER |

| BIT | Bit7 | Bit6 | Bit5 | Bit4 | Bit3 | Bit2 | Bit1 | Bit0 |
|---|---|---|---|---|---|---|---|---|
| FUNCTION NAME | B7 | B6 | B5 | B4 | B3 | B2 | B1 | B0 |

DMA CONTROLLER AND DMA TRANSFER METHOD

CROSS-REFERENCE TO RELATED APPLICATIONS

This application is based upon and claims the benefit of priority from the prior Japanese Patent Application No.2002-252704, filed on Aug. 30, 2002, the entire contents of which are incorporated herein by reference.

BACKGROUND OF THE INVENTION

1) Field of the Invention

The present invention relates to a direct memory access (DMA) controller that performs DMA transfer for a plurality of data transfer channels, and a DMA transfer method therefor.

2) Description of the Related Art

A system that employs a central processing unit ("CPU") conventionally has a DMA transfer function. The DMA transfer function means performing data transfer without causing the CPU to intervene so as to transfer data between a plurality of peripherals and a memory at high rate. This DMA transfer function is controlled by a DMA controller, the basic operation of which will be explained below.

If a DMA request is issued from a peripheral allocated to each channel, to the DMA controller, the DMA controller issues a bus hold request to the CPU. If a plurality of DMA requests are issued from peripherals, the DMA controller prepares for data transfer for the highest priority channel in accordance with preset priorities.

If the CPU accepts the bus hold request from the DMA controller, the CPU hands over a bus management right to the DMA controller. The DMA controller starts the data transfer between the memory and the peripherals using the bus as a DMA transfer data path. The data transfer is performed while DMA requests are continuously issued. In a burst mode, the data transfer of a preset size can be performed.

However, the conventional technique is always required to take arbitration procedures for the bus management right between the DMA controller and the CPU as a preparation for starting the DMA transfer. As a result, if the DMA transfer is frequently performed, the arbitration procedures disadvantageously deteriorate data transfer efficiency.

Although it is possible to decrease DMA transfer frequency by using the burst mode, the burst mode increases a data length and bus occupation time per channel tends to increase, accordingly. This results in an increase in wait time until a DMA request is processed, disadvantageously causing latency to the data between the channels. Besides, a buffer necessary to hold data needs to be large in size.

SUMMARY OF THE INVENTION

It is an object of the present invention to at least solve the problems in the conventional technology.

The DMA controller according to one aspect of the present invention comprises a data quantity setting unit that sets a data transfer quantity of each of a plurality of DMA channels; a channel select control unit that determines whether each DMA channel is active; and a data transfer control unit that transfers data of each of the DMA channels determined to be active by the channel select control unit, in accordance with the data transfer quantity of each DMA channel set by the data quantity setting unit.

According to the above aspect, DMA requests from a plurality of peripherals existing on the same bus are simultaneously accepted when a right to use the bus is acquired once, it is determined whether each of the DMA channels is active, and DMA transfer is performed based on the preset data transfer quantity of each of the DMA channels. At this moment, the data transfer quantity of each DMA channel for a total quantity of the data to be transferred when the right to use the bus is acquired is transferred in accordance with a fixed data quantity or a channel specific ratio.

These and other objects, features and advantages of the present invention are specifically set forth in or will become apparent from the following detailed descriptions of the invention when read in conjunction with the accompanying drawings.

DETAILED DESCRIPTION

Exemplary embodiments of the DMA controller and the DMA transfer method according to the present invention will be explained hereinafter in detail with reference to the accompanying drawings. A channel band guarantee type DMA controller according to the present invention processes DMA requests from a plurality of peripherals that exist on the same bus when a right to use the bus is acquired once.

Figure 1:
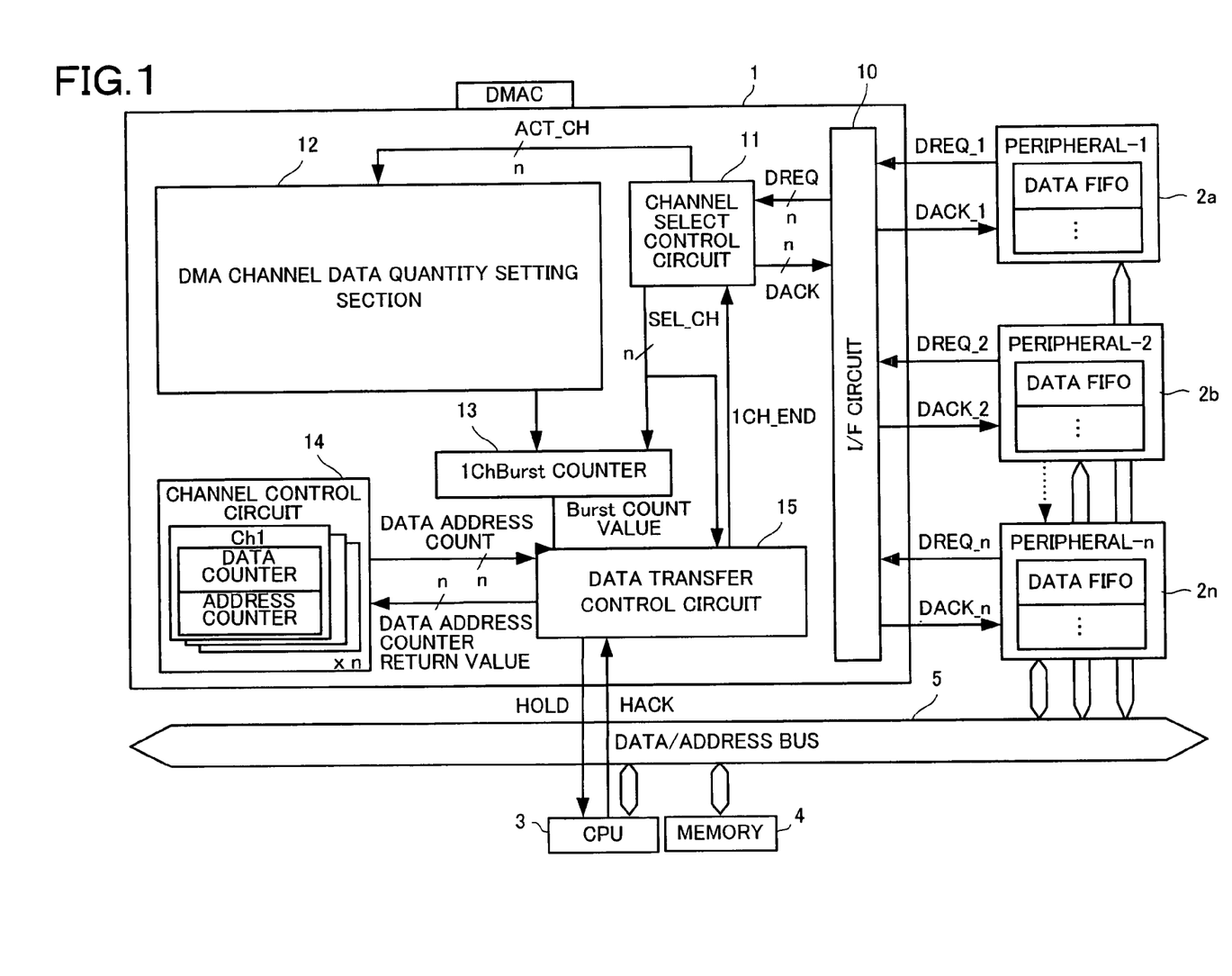
FIG. 1 is a block diagram that shows the basic configuration of a DMA controller according to the present invention.

FIG. 1 is a block diagram that shows the basic configuration of the DMA controller according to the present invention. Peripherals (peripheral-1 to peripheral-n) 2a to 2n for a plurality of DMA channels (hereinafter "channels") Ch1 to Chn, a CPU 3, and a memory 4 are connected to the DMA controller (DMAC) 1. The DMA transfer is performed between the peripherals 2a to 2n and the memory 4 through a bus (hereinafter "data/address bus") 5 under the control of the DMA controller 1.

Figure 2:
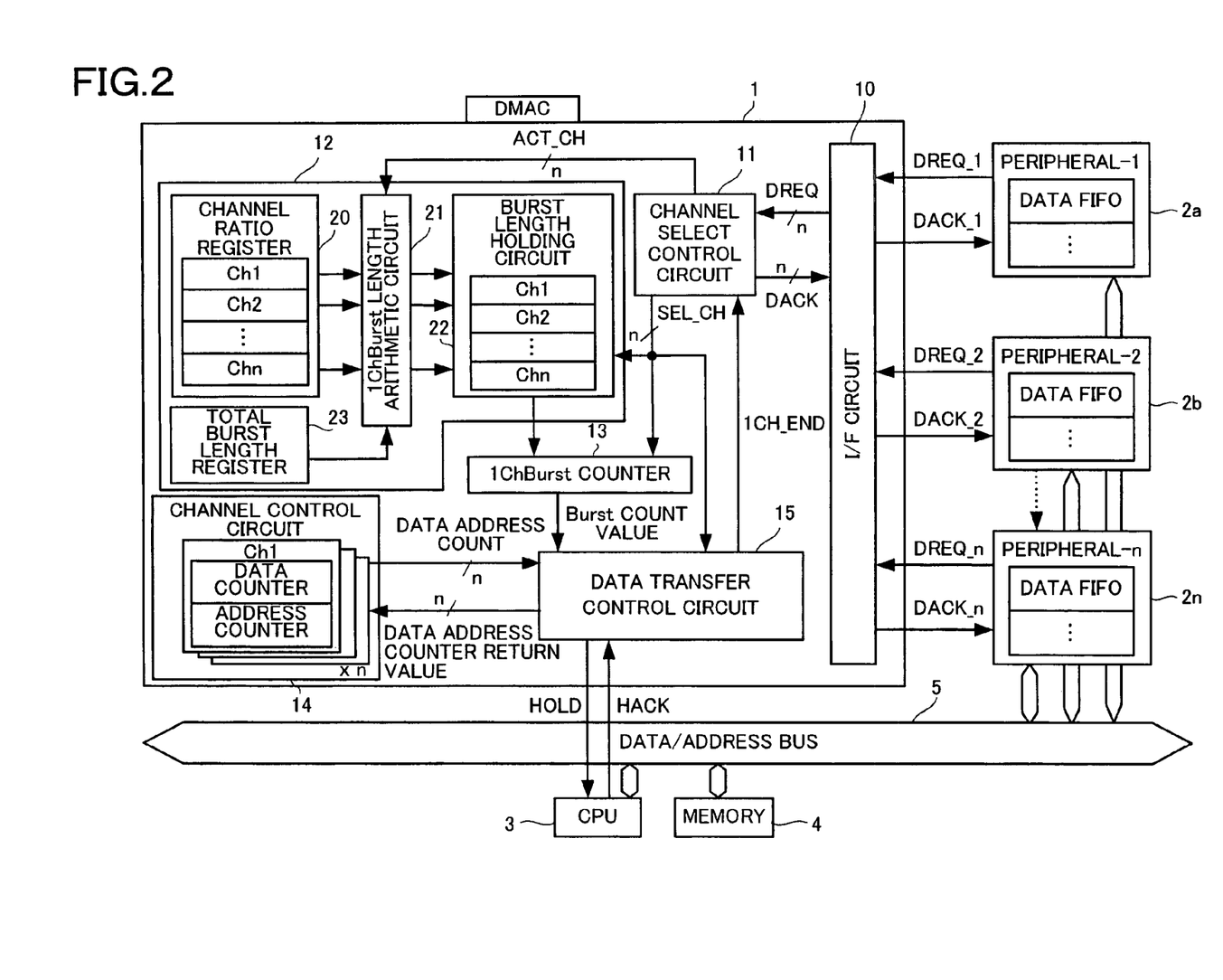
FIG. 2 is a block diagram that shows the configuration of a first embodiment of the DMA controller according to the present invention.

The DMA controller 1 includes an interface (I/F) circuit 10, a channel select control circuit 11, a DMA channel data quantity setting section 12, a burst length counter (hereinafter "1ChBurst counter") 13, a channel control circuit 14, and a data transfer control circuit 15. The I/F circuit 10 controls the data transfer for the data of the peripherals 2a to 2n on the respective channels. The channel select control circuit 11 determines whether the DMA channels are active based on transfer requests DREQ output from the peripherals 2a to 2n, and selects the execution of the DMA transfer of the data of one active DMA channel. The DMA channel data quantity setting section 12 presets the data transfer quantity of each channel. The burst length counter 13 counts the burst length of each channel. The channel control circuit 14 counts the data and address of each channel. The data transfer control circuit 15 arbitrates a bus use right between the DMA controller 1 and the CPU 3, and controls data transfer operations such as DMA read/write. FIG. 2 is a block diagram that shows detailed configuration of the DMA controller 1. This DMA controller is configured to set the data quantity of each DMA channel in accordance with the ratio of the data quantity of each channel to a total data quantity to be transferred by the DMA controller when one bus right is acquired.

The DMA controller 1 comprises the DMA channel data quantity setting section 12. The DMA channel data quantity setting section 12 includes a channel ratio register 20, a burst length arithmetic circuit (hereinafter "1ChBurst length arithmetic circuit") 21, a burst length holding circuit 22, and a total burst length register 23. The channel ratio register 20 sets the ratio of each data quantity to the total data quantity. The burst length arithmetic circuit 21 operates a data quantity from the ratio of the data quantity to the total data quantity. The burst length holding circuit 22 holds the data quantity of each channel thus operated. The total burst length register 23 sets the burst length of the total transfer quantity.

Figure 3A:
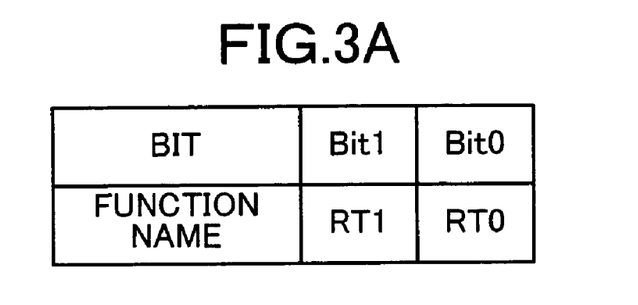
FIGS. 3A and 3B are tables that show an example of the configuration of a channel ratio register.
Figure 3B:
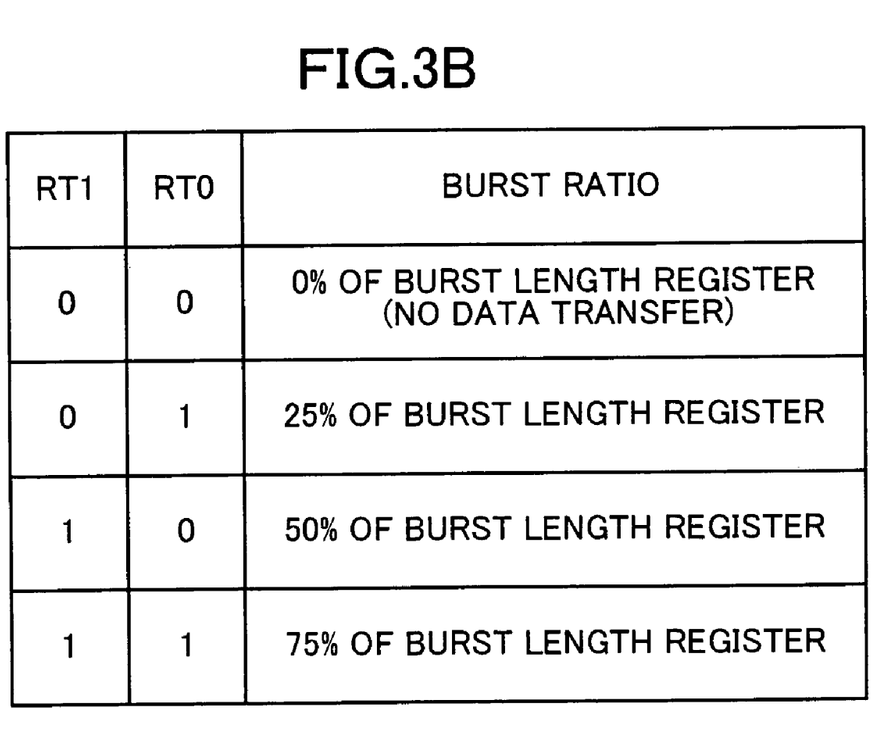

FIGS. 3A and 3B are tables that show one example of the configuration of the channel ratio register 20. The channel ratio register 20 sets the ratio of the data quantity of each DMA channel to the total data quantity. It is possible to set four ratios as shown in FIG. 3B using two bits of RT1 and RT0 shown in FIG. 3A for each channel Ch. For example, for a certain channel, if the bit RT1 is set at "0" and the bit RT0 is set at "1", it is possible to set the ratio of the data quantity of the certain channel to the total data quantity at 25% of the total transfer rate. If the number of bits shown in FIG. 3B increases, it is possible to set ratios more minutely.

The configuration of the 1ChBurst length arithmetic circuit 21 can be changed, depending on whether an empty area is used. That is, it is possible to determine whether to transfer the data of active DMA channels during the transfer time (empty time) of an inactive DMA channel.

Figure 4:
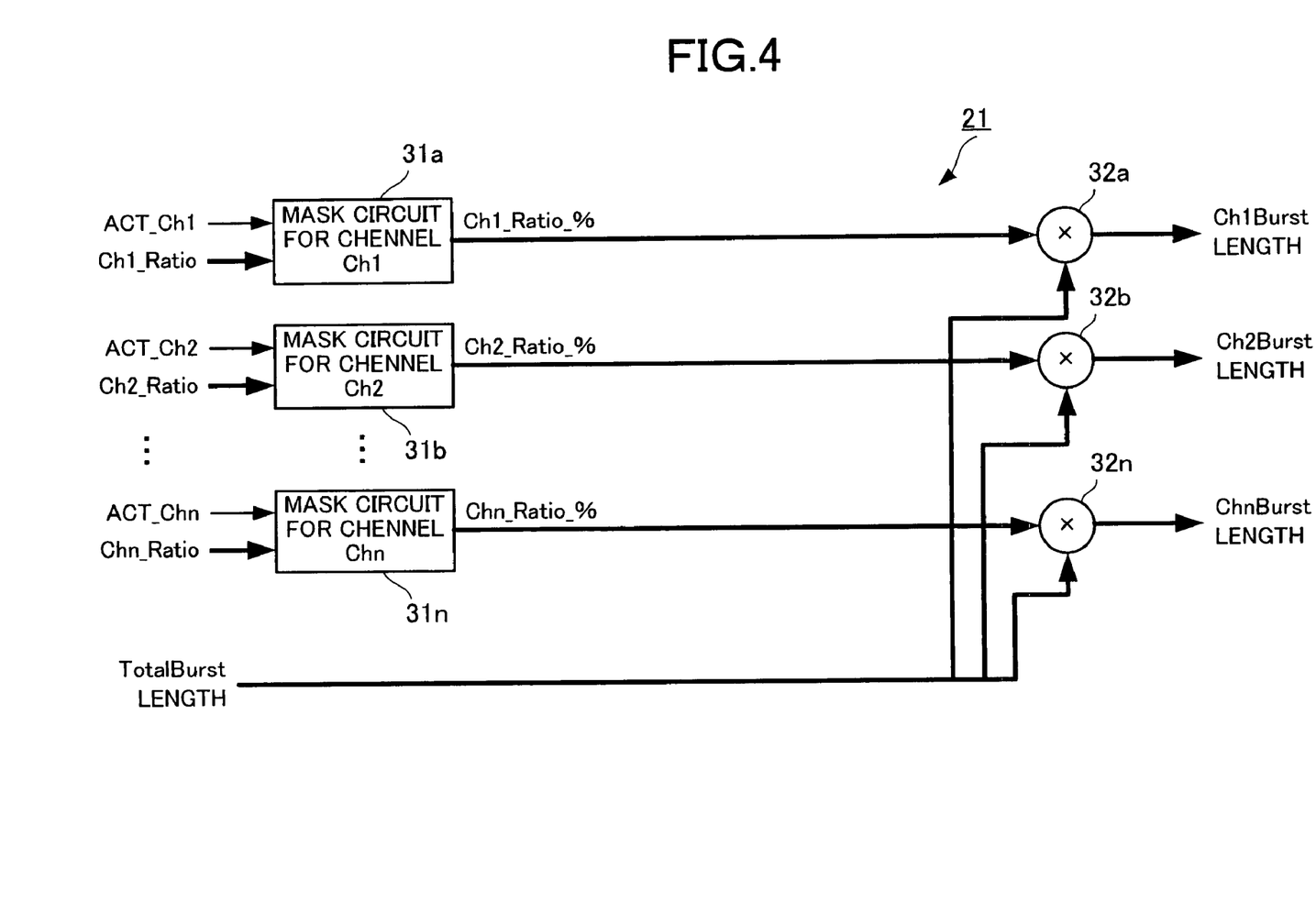
FIG. 4 is a block diagram that shows an example of the setting of a 1ChBurst length arithmetic circuit.

FIG. 4 is a block diagram that shows one example of the setting of the 1ChBurst length arithmetic circuit 21. With this configuration, no empty area is used. Mask circuits Ch1 (31a) to Chn (31n) are provided to correspond to the respective channels. Active signals (ACT_Ch1 to ACT_Chn) from the channel select control circuit 11 and channel ratio signals (Ch1_Ratio to Chn_Ratio) from the channel ratio register 20 are input into the mask circuits 31a to 31n for the respective channels.

The mask circuits for channels 1 (Ch1) to n (Chn) 31a to 31n operate the ratios of the data quantities of the respective channels based on the ratios of the corresponding channel ratio signals when the corresponding active signals are active, and output the operation results to corresponding multipliers 32a to 32n. A total data quantity (TotalBurst length) is input into the multipliers 32a to 32n from the total burst length register 23. The multipliers 32a to 32n operate the data quantities of the corresponding channels (Ch1Burst length to ChnBurst length) and output the operation results, respectively. If the corresponding active signals are inactive, the mask circuits 31a to 31n output 0(%) as the ratios of the data quantities of the respective channels.

A fixed data quantity is allocated to each channel, irrespective of the state of the channel (active or inactive). Therefore, during empty time, the data of other active DMA channels is not transferred and the bus use right is abandoned.

Figure 5:
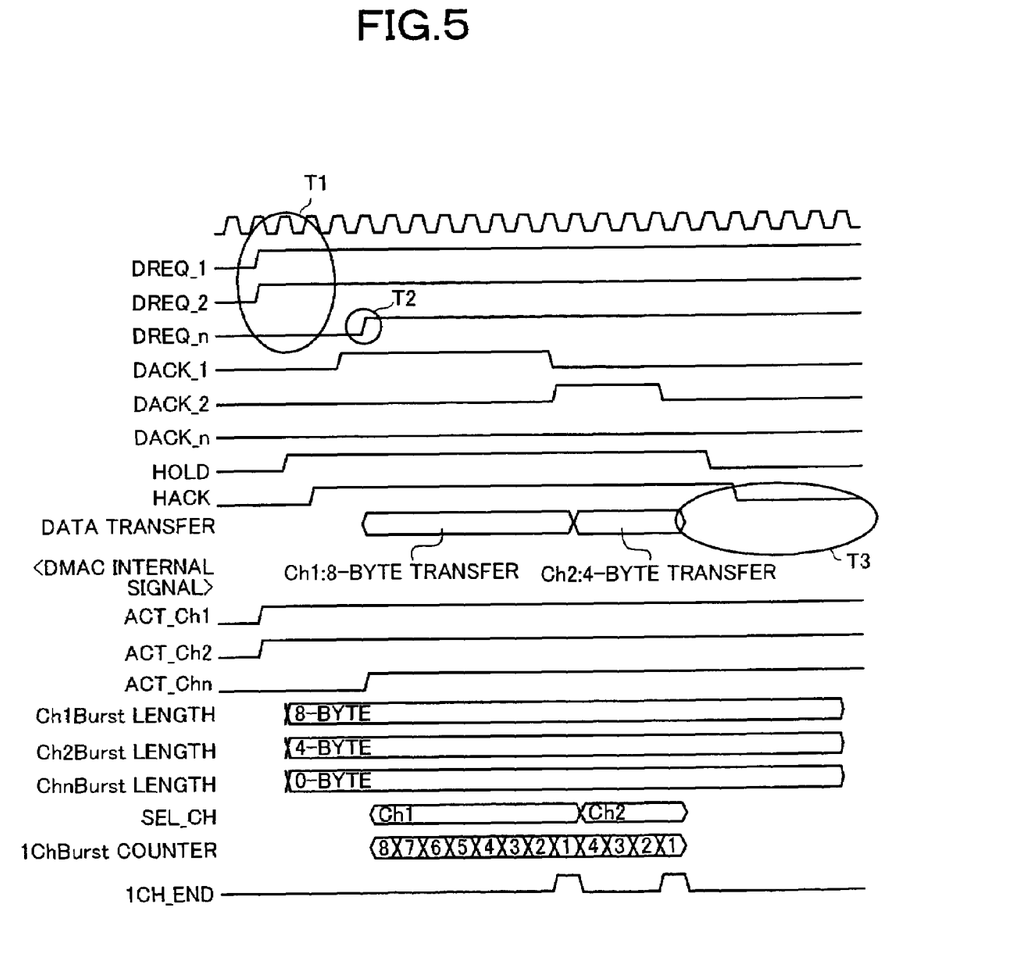
FIG. 5 is a timing chart that explains a DMA transfer processing in the first embodiment.

FIG. 5 is a timing chart that explains a DMA transfer processing in the first embodiment. Setting conditions are as follows. The total burst length of the total burst length register 23 is 16-bytes, and the Ch1_Ratio, Ch2_Ratio, and Chn_Ratio of the channel ratio register 20 is 50%, 25%, and 25%, respectively.

Among the peripherals 2a to 2n, the peripherals 2a and 2b first output transfer requests DREQ_1 and DREQ_2, respectively (at time T1). If a transfer request DREQ_n is delayed (output at time T2), the channel select control circuit 11 determines that only the channels Ch1 and Ch2 are active (outputs ACT_Ch1 and ACT_Ch2) based on the rise of the initially output transfer requests DREQ_1 and DREQ_2. The data transfer control circuit 15 outputs one bus hold request (HOLD) to the CPU 3.

Thereafter, the 1ChBurst length arithmetic circuit 21 operates the ratio of the data quantity of each channel, and DMA transfer is performed for the active channels based on the corresponding ratios. In the example of FIG. 5, the channel select control circuit 11 determines that only the channels Ch1 and Ch2 are active, 50% of 16-bytes that is TotalBurst length, i.e., the data of 8-bytes of the channel Ch1 is DMA-transferred, and 25% of 16-bytes that is TotalBurst length, i.e., the data of 4-bytes of the channel Ch2 is DMA-transferred.

Consequently, the data of only the channels Ch1 and Ch2 for which DMA transfer requests are issued from the corresponding peripherals and which are determined active, is DMA-transferred by one bus use right. At this moment, since the empty capacity is not used, only the data of 12-bytes of the channels Ch1 and Ch2 among 16-bytes that is the total quantity of data to be used, is transferred. During transfer expected time (time T3) allocated to the channel Chn, the bus use right is abandoned.

Figure 6:
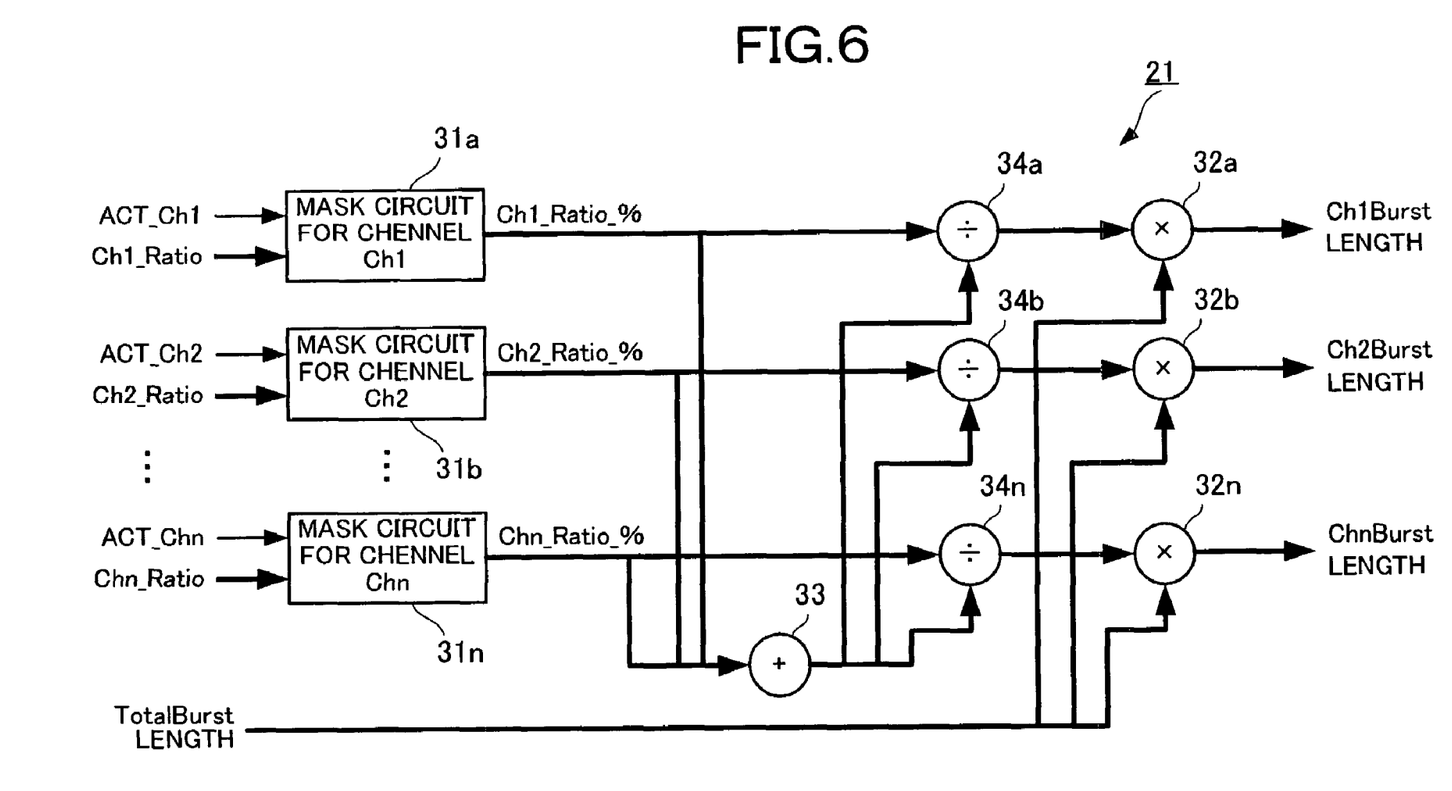
FIG. 6 is a block diagram that shows another example of the configuration of the 1ChBurst length arithmetic circuit.

FIG. 6 is a block diagram that shows another example of the configuration of the 1ChBurst length arithmetic circuit as a second embodiment of the present invention. An empty area is reset in accordance with the ratio of the data quantity of each DMA channel. The mask circuits 31a to 31n are provided for each of the channels 1 (Ch1) to n (Chn). The active signals (ACT_Ch1 to ACT_Chn) from the channel select control circuit 11 and the channel ratio signals (Ch1_13 Ratio to Chn_Ratio) from the channel ratio register 20 are input into the mask circuits 31a to 31n for the respective channels.

The mask circuits 31a to 31n operate the ratios (%) of the data quantities of the respective channels based on the ratios of the corresponding channel ratio signals, and output the operation results to corresponding dividers 34a to 34n provided in rear of the mask circuits 31a to 31n, respectively, and to an adder 33. The adder 33 adds the ratios of the data quantities of all the active channels, and outputs the addition result to the dividers 34a to 34n. Therefore, the dividers 34a to 34n can operate again the ratios (%) of the data quantities of the respective channels in accordance with the ratios of the corresponding channel ratio signals based on the ratios (%) of the data quantities of all the active channels.

Thereafter, the ratios (%) of the data quantities of the channels are output to the multipliers 32a to 32n, respectively. The total data quantity (Totalburst length) is input into the multipliers 32a to 32n from the total burst length register 23. The multipliers 32a to 32n operate the data quantities of the corresponding channels (Ch1Burst length to ChnBurst length) and output the operation results, respectively.

If an empty area occurs, it is possible to allocate data quantities to all the active channels based on the corresponding channel ratios.

Figure 7:
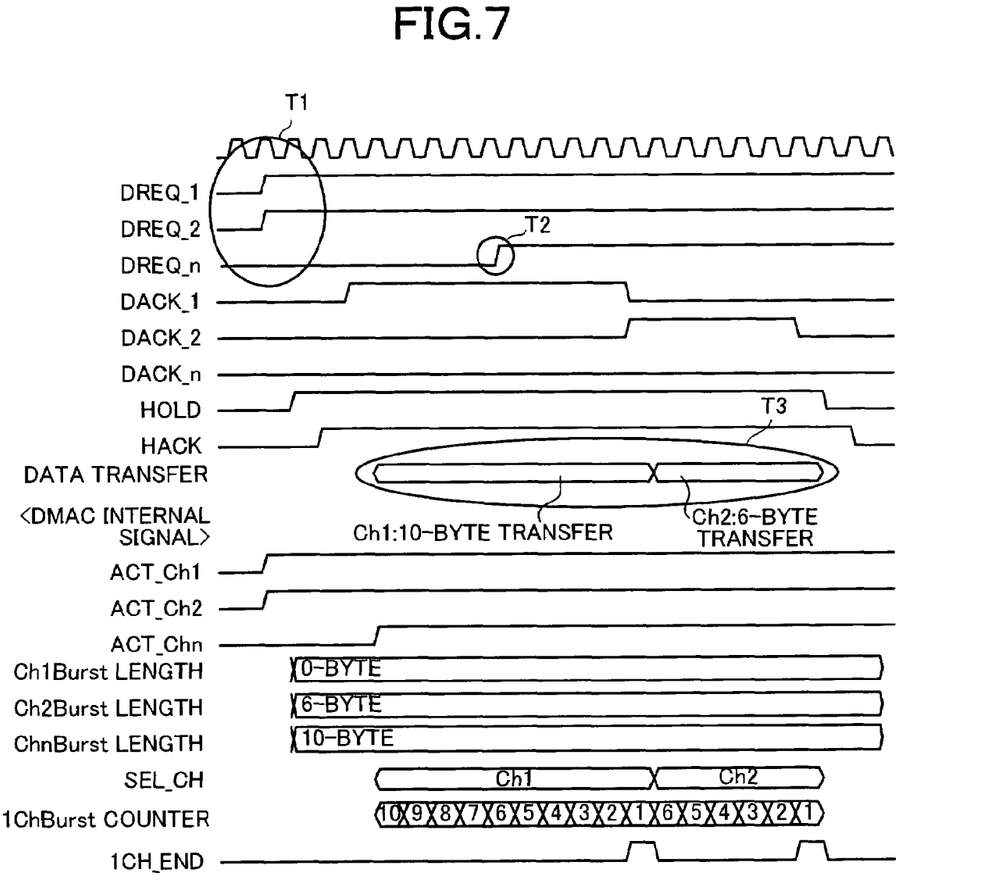
FIG. 7 is a timing chart that explains a DMA transfer processing in a second embodiment.

FIG. 7 is a timing chart that explains a DMA transfer processing in the second embodiment. Setting conditions are as follows. The total burst length of the total burst length register 23 is 16-bytes, and the Ch1_Ratio, Ch2_Ratio, and Chn_Ratio of the channel ratio register 20 is 50%, 25%, and 25%, respectively.

Among the peripherals 2a to 2n, the peripherals 2a and 2b first output transfer requests DREQ_1 and DREQ_2, respectively (at the time T1). If a transfer request DREQ_n is delayed (output at the time T2), the channel select control circuit 11 determines that only the channels Ch1 and Ch2 are active (outputs ACT_Ch1 and ACT_Ch2) based on the rise of the initially output transfer requests DREQ_1 and DREQ_2. The data transfer control circuit 15 outputs one bus hold request (HOLD) to the CPU 3.

Thereafter, the 1ChBurst length arithmetic circuit 21 operates the ratio of the data quantity of each channel, the total data quantity of the active channels is divided by the ratio of each channel and DMA transfer is performed based on the corresponding ratios. In the example of FIG. 7, the channel select control circuit 11 determines only the channels Ch1 and Ch2 are active. At this moment, the ratios of the data quantities of the channels Ch1 and Ch2 are adjusted to be equal to 100%. The ratios of the channels Ch1 and Ch2 are Ch1:Ch2=50%:25%=2:1. Therefore, if the ratios are recalculated based on the total ratio (100%), the ratios of the data quantities of the channels Ch1 and Ch2 are Ch1=$\frac{2}{3}$=66.6% and Ch2=$\frac{1}{3}$=33.3%. As a result, 66.6% of 16-bytes that is TotalBurst length, i.e., the data of 10-bytes of the channel Ch1 is DMA transferred, and 33.3% of 16-bytes that is TotalBurst length, i.e., the data of 6-bytes of the channel Ch2 is DMA transferred (at time T3).

Consequently, the data of only the channels Ch1 and Ch2 for which DMA transfer requests are issued from the corresponding peripherals and which are determined active, are DMA-transferred by one bus use right. At this moment, an empty capacity is re-allocated to each channel in accordance with the ratios of the active channels. Thus, it is possible to transfer the data of all the data quantity 16-bytes to be used as the data of only the active channels Ch1 and Ch2 at all the time including the Chn transfer expected time.

Figure 8:
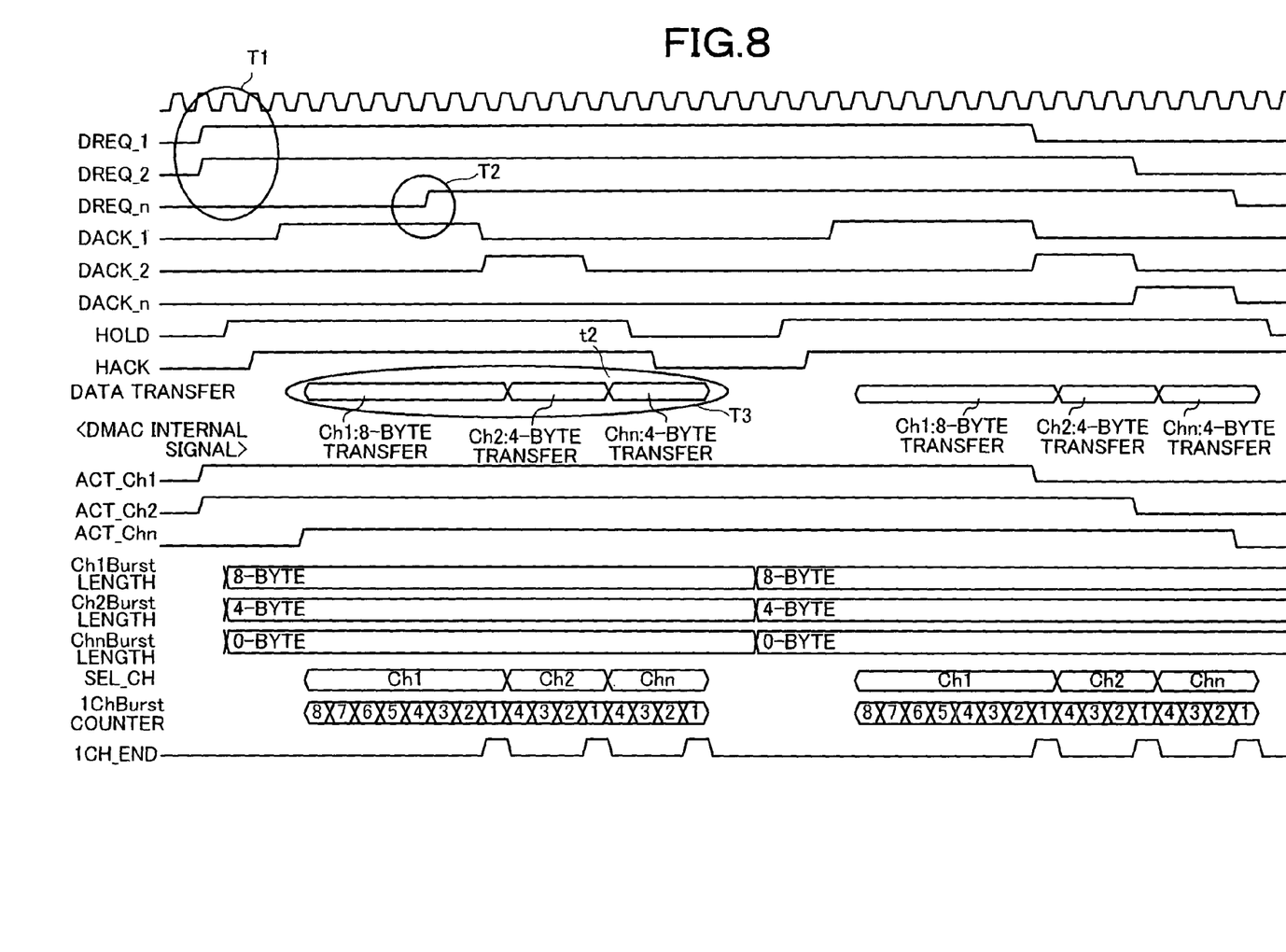
FIG. 8 is a timing chart that explains a DMA transfer processing in the configuration of a third embodiment.

As a third embodiment of the present invention, the DMA transfer of the data of the channels Ch1 to Chn that become active is executed in the period of one bus hold request (HOLD), irrespective of whether a plurality of DMA transfer requests are output simultaneously. FIG. 8 is a timing chart that explains a DMA transfer processing in the configuration of the third embodiment. Setting conditions are the same as those in the preceding embodiments. Namely, the total burst length of the total burst length register 23 is 16-bytes, and the Ch1_Ratio, Ch2_Ratio, and Chn_Ratio of the channel ratio register 20 is 50%, 25%, and 25%, respectively.

It is assumed herein that the peripherals 2a and 2b, for example, among the peripherals 2a to 2n first output transfer requests DREQ_1 and DREQ_2 (at the time T1), and the transfer request DREQ_n is delayed (output at the time T2). If so, the channel select control circuit 11 first determines that the channels Ch1 and Ch2 are active (outputs ACT_Ch1 and ACT_Ch2) based on the rise of the transfer requests DREQ_1 and DREQ_2.

The data quantity of each channel is such that the empty area is not used. The 1ChBurst length arithmetic circuit 21 operates the ratio of the data quantity of each channel, and DMA transfer is executed based on the ratios for the active channels. In the example shown, only the channels Ch1 and Ch2 are determined to be active, 50% of 16-bytes that is TotalBurst length, i.e., the data of 8-bytes of the channel Ch1 is DMA transferred, and 25% of 16-bytes that is TotalBurst length, i.e., the data of 4-bytes of the channel Ch2 is DMA transferred.

One bus hold request (HOLD) is output to the CPU 3, whereby pieces of data of the channels Ch1 and Ch2 are sequentially DMA-transferred. If the following channel (Chn) becomes active before the data of the final channel (channel Ch2 in this example) for which the DMA transfer is performed is finished (at the time T2), the channel select control circuit 11 executes DMA transfer (4-bytes) of the channel Chn that becomes active in the period in which this one bus use right is acquired (at the time T3).

According to the third embodiment, even if an additional DMA transfer request is output for a certain channel, DMA transfer operations can be continuously executed as long as this additional request is output before the DMA transfer of the active channel is finished, irrespective of whether a plurality of DMA transfer requests are simultaneously output.

Figure 9:
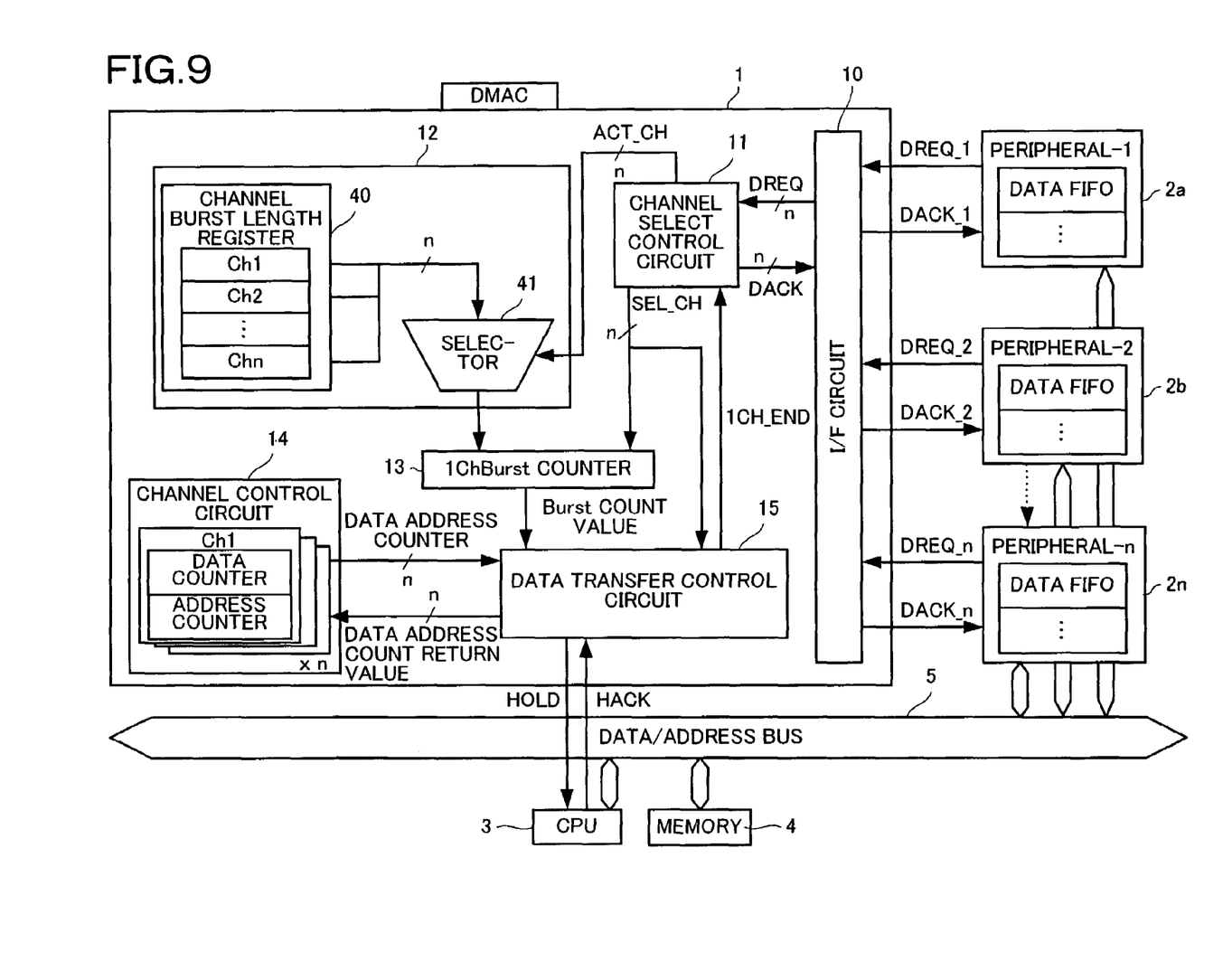
FIG. 9 is a block diagram that shows the configuration of a fourth embodiment of the DMA controller according to the present invention.

FIG. 9 is a block diagram that shows the configuration of a fourth embodiment of the channel band guarantee type DMA controller according to the present invention. In the fourth embodiment, the data quantity of each channel to be transferred by the DMA controller by one bus right acquisition is preset in bytes. The DMA channel data quantity setting section 12 consists of a channel burst length register 40 that sets the data quantity of each channel in bytes, and a selector 41 that outputs the data quantities of currently active channels from the channel burst length register 40 to a read 1 ChBurst counter 13.

Figure 10:
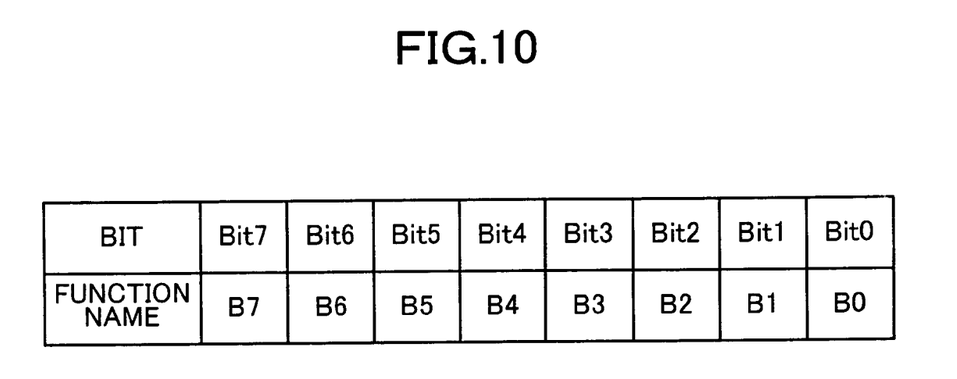
FIG. 10 is a table that shows one example of the configuration of a channel burst length register.

FIG. 10 is a table that shows one example of the configuration of the channel burst length register 40. The channel burst length register 40 sets a fixed data quantity (in bytes) to be transferred at each of the bits (Bit0 to Bit7) of the respective channels. By setting so, it is possible to specify the data quantities to be transferred of a plurality of channels when one bus use right is acquired.

As explained so far, the channel band guarantee type DMA controller in the embodiments of the present invention can transfer the data of a plurality of channels in accordance with respective predetermined ratios whenever one bus use right is acquired.

According to the present invention, when one bus hold request is issued, the band is guaranteed for each channel and the data of the respective channels is continuously DMA-transferred in response to a plurality of DMA transfer requests output from a plurality of peripherals existing on the same bus. It is, therefore, possible to decrease the number of bus management right arbitration procedures and the latency between the channels, to improve transfer efficiency, and to guarantee the minimum transfer rate of each channel. It is thereby possible to facilitate the management of the bus at the time of designing a system.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A direct memory access controller that acquires one bus usage right from a CPU to perform one burst data transfer between a memory and a plurality of peripherals that is assigned to a plurality of direct memory access (DMA) channels, respectively, the direct memory access controller comprising:
a channel select control unit that determines which DMA channels are active channels immediately before the direct memory access controller acquires the one bus usage right;
a data quantity setting unit that determines, for each of the active channels, an amount of data to be transferred through each of the active channels in the one burst data transfer; and
a data transfer control unit that performs the one burst data transfer which corresponds to the one bus usage right and in which a k-th data having a k-th amount determined by the data quantity setting unit and a k+1-th data having a k+1-th amount determined by the data quantity setting unit are sequentially transferred through a k-th active channel and a k+1-th active channel, respectively, where k is a positive integer, wherein the data quantity setting unit comprises:
a channel ratio register that stores a k-th ratio and a k+1-th ratio: and
a burst length arithmetic unit that calculates the k-th amount by multiplying the k-th ratio and a burst length of the burst data transfer, and calculates the k+1-th amount by multiplying the k+1-th ratio and the burst length of the burst data transfer.

2. The direct memory access controller according to claim 1 wherein the data quantity setting unit comprises:
a burst length register that stores the k-th amount and the k+1-th amount; and
a selector that selectively outputs the k-th amount and the k+1-th amount stored in the burst length register.

3. The direct memory access controller according to claim 1, wherein
the channel select control unit re-determines which DMA channels are active channels immediately before the data transfer control unit finishes transferring the k+1-th data.

4. A direct memory access controller that acquires one bus usage right from a CPU to perform one burst data transfer between a memory and a plurality of peripherals that is assigned to a plurality of direct memory access (DMA) channels, respectively, the direct memory access controller comprising:
a channel select control unit that determines which DMA channels are active channels immediately before the direct memory access controller acquires the one bus usage right;
a data quantity setting unit that determines, for each of the active channels, an amount of data to be transferred through each of the active channels in the one burst data transfer; and
a data transfer control unit that performs the one burst data transfer which corresponds to the one bus usage right and in which a k-th data having a k-th amount determined by the data quantity setting unit and a k+1-th data having a k+1-th amount determined by the data quantity setting unit are sequentially transferred through a k-th active channel and a k+1-th active channel, respectively, where k is a positive integer, wherein;
the data quantity setting unit comprises:
a channel ratio register that stores a k-th ratio and a k+1-th ratio; and
a burst length arithmetic unit that calculates the k-th amount by multiplying the k-th ratio, a burst length of the burst data transfer, and an inverse of a sum of ratios assigned to the active channels, and calculates the k+1-th amount by multiplying the k+1-th ratio, the burst length of the burst data transfer, and the inverse of the sum of ratios assigned to the active channels.

5. A method for a direct memory access controller that acquires one bus usage right from a CPU to perform one burst data transfer between a memory and a plurality of peripherals that is assigned to a plurality of direct memory access (DMA) channels, respectively, the method comprising:
determining which DMA channels are active channels immediately before the direct memory access controller acquires the one bus usage right;
determining an amount of data to be transferred through each of the active channels in the one burst data transfer, for each of the active channels; and
performing the one burst data transfer which corresponds to the one bus usage right and in which a k-th data having a k-th amount and a k+1-th data having a k+1-th amount are sequentially transferred through a k-th active channel and a k+1-th active channel, respectively, where k is a positive integer,
wherein said determining an amount of data to be transferred through each of the active channels, comprises:
storing a k-th ratio and a k+1-th ratio,
calculating the k-th amount by multiplying the k-th ratio and a burst length of the burst data transfer, and
calculating the k+1-th amount by multiplying the k+1-th ratio and the burst length of the burst data transfer.

6. The method for the direct memory access controller according to claim 5, wherein said determining an amount of data to be transferred through each of the active channels further comprises:
storing the k-th amount and the k+1-th amount; and
selectively outputting the k-th amount and the k+1-th amount stored therein.

7. The method for the direct memory access controller according to claim 5, wherein the determining which DMA channels are active comprise re-determining which DMA channels are active channels immediately before the data transfer control unit finishes transferring the k+1-th data.

8. A method for a direct memory access controller that acquires one bus usage right from a CPU to perform one burst data transfer between a memory and a plurality of peripherals that is assigned to a plurality of direct memory access (DMA) channels, respectively, the method comprising:
determining which DMA channels are active channels immediately before the direct memory access controller acquires the one bus usage right;
determining an amount of data to be transferred through each of the active channels in the one burst data transfer, for each of the active channels; and
performing the one burst data transfer which corresponds to the one bus usage right and in which a k-th data having a k-th amount determined by the data quantity setting unit and a k+1-th data having a k+1-th amount determined by the data quantity setting unit are sequentially transferred through a k-th active channel and a k+1-th active channel, respectively, where k is a positive integer, wherein the determining an amount of data to be transferred through each of the active channels comprises:

storing a k-th ratio and a k+1-th ratio, calculating the k-th amount by multiplying the k-th ratio, a burst length of the burst data transfer, and an inverse of a sum of ratios assigned to the active channels, and calculating the k+1-th amount by multiplying the k+1-th ratio, the burst length of the burst data transfer, and the inverse of the sum of ratios assigned to the active channels.

* * * * *

UNITED STATES PATENT AND TRADEMARK OFFICE
CERTIFICATE OF CORRECTION

| | | |
|---|---|---|
| PATENT NO. | : 7,380,027 B2 | Page 1 of 1 |
| APPLICATION NO. | : 10/642145 | |
| DATED | : May 27, 2008 | |
| INVENTOR(S) | : Kazuhito Takashima et al. | |

It is certified that error appears in the above-identified patent and that said Letters Patent is hereby corrected as shown below:

Column 7, Line 36, after "1" insert --,--.

Column 8, Line 45, change "outputing" to --outputting--.

Signed and Sealed this

Twenty-first Day of October, 2008

JON W. DUDAS
*Director of the United States Patent and Trademark Office*